US010254594B2

(12) United States Patent
Jiang et al.

(10) Patent No.: US 10,254,594 B2
(45) Date of Patent: Apr. 9, 2019

(54) LIQUID CRYSTAL DROP FILLING SYSTEM AND CONTROL METHOD

(71) Applicants: BOE TECHNOLOGY GROUP CO., LTD., Beijing (CN); HEFEI XINSHENG OPTOELECTRONICS TECHNOLOGY CO., LTD., Xinzhan, Hefei, Anhui (CN)

(72) Inventors: Xuebing Jiang, Beijing (CN); Ran Zhang, Beijing (CN); Jian Zhao, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 143 days.

(21) Appl. No.: 15/326,363

(22) PCT Filed: Feb. 24, 2016

(86) PCT No.: PCT/CN2016/074437
§ 371 (c)(1),
(2) Date: Jan. 13, 2017

(87) PCT Pub. No.: WO2017/049863
PCT Pub. Date: Mar. 30, 2017

(65) Prior Publication Data
US 2017/0269407 A1    Sep. 21, 2017

(30) Foreign Application Priority Data

Sep. 25, 2015 (CN) .......................... 2015 1 0624533

(51) Int. Cl.
*G02F 1/1341* (2006.01)
*G09G 3/36* (2006.01)
*G02F 1/13* (2006.01)

(52) U.S. Cl.
CPC .......... *G02F 1/1341* (2013.01); *G02F 1/1309* (2013.01); *G09G 3/3607* (2013.01);
(Continued)

(58) Field of Classification Search
CPC ................. G02F 1/1309; G02F 1/1341; G02F 2001/13415; G09G 3/3607; G09G 2320/0693; G09G 2330/10
See application file for complete search history.

(56) References Cited

U.S. PATENT DOCUMENTS

2002/0048411 A1* 4/2002 Takayama ................ G06K 9/40
382/275
2005/0007364 A1* 1/2005 Oyama ................. G02F 1/1309
345/428
(Continued)

FOREIGN PATENT DOCUMENTS

CN        102000652 A      4/2011
CN        102033364 A      4/2011
(Continued)

OTHER PUBLICATIONS

First Chinese Office Action, for Chinese Patent Application No. 201510624533.1, dated Aug. 25, 2017, 12 pages.
(Continued)

*Primary Examiner* — Edward Park
(74) *Attorney, Agent, or Firm* — Kinney & Lange, P.A.

(57) ABSTRACT

Embodiments of the present disclosure relates to a liquid crystal drop filling system comprising a liquid crystal drop filling device performing a liquid crystal drop filling process to obtain a liquid crystal panel; an image acquisition device acquiring an image of the liquid crystal panel; an image processor processing the acquired image and determining a defect of the liquid crystal panel based on the processed image; and a communication module communicating an information about the defect determined by the image processor to the liquid crystal drop filling device, so that the liquid crystal drop filling device can adjust parameters of the liquid crystal drop filling process according to the information. In addition, the present disclosure further discloses a control method of a liquid crystal drop filling system.

8 Claims, 3 Drawing Sheets

(52) U.S. Cl.
CPC .............. *G02F 2001/13415* (2013.01); *G09G 2320/0693* (2013.01); *G09G 2330/10* (2013.01)

(56) References Cited

U.S. PATENT DOCUMENTS

| | | | |
|---|---|---|---|
| 2005/0068488 A1* | 3/2005 | Tajima | G02F 1/1339 349/190 |
| 2009/0101064 A1 | 4/2009 | Naka et al. | |
| 2010/0208192 A1 | 8/2010 | Mochizuki et al. | |
| 2013/0256528 A1* | 10/2013 | Xiao | G01N 23/2251 250/307 |
| 2016/0033835 A1 | 2/2016 | Park et al. | |

FOREIGN PATENT DOCUMENTS

| | | | |
|---|---|---|---|
| CN | 102460289 A | 5/2012 | |
| CN | 105137670 A | 12/2015 | |
| JP | 2004344743 A | 12/2004 | |
| JP | 2004344743 A | 12/2004 | |
| WO | 2006075462 A1 | 7/2006 | |

OTHER PUBLICATIONS

International Search Report and Written Opinion (including English translation of Box V.) dated May 27, 2016, for corresponding PCT Application No. PCT/CN2016/074437.

\* cited by examiner

LIQUID CRYSTAL DROP FILLING SYSTEM AND CONTROL METHOD

CROSS-REFERENCE TO RELATED APPLICATION

This application claims the benefit of Chinese Patent Application No. 201510624533.1 filed on Sep. 25, 2015 in the State Intellectual Property Office of China, the whole disclosure of which is incorporated herein by reference.

BACKGROUND OF THE INVENTION

Field of the Invention

Embodiments of the present disclosure relates to the field of liquid crystal panel manufacturing technology, and in particular to a liquid crystal drop filling system for manufacturing a liquid crystal panel and a related control methods.

Description of the Related Art

An existing TFT-LCD substrate mainly comprises a color film (CF) substrate and a thin film transistor (TFT) substrate. These two substrates have their surrounding sealed by a sealant at a bonding process section, at same time the sealant seals the liquid crystal in a box so as to, form a liquid crystal panel. At present, a commonly used liquid crystal injection process is a process so called One Drop Filling (abbreviated as ODF). In general, the reference value of the liquid crystal drop rate may be calculated theoretically. After considering key parameters such as the thickness of the film, the height of the photo spacer (PS) on side of the color film, the box thickness after assembly, a plurality of different liquid crystal amounts (LC Split) within a range around the calculated reference value by ±6% were prepared, and the final center liquid crystal amount and the variable range of the liquid crystal amount (influenced by normal fluctuation of the processes) were determined by a LC Margin evaluation experiment.

Figure 1:
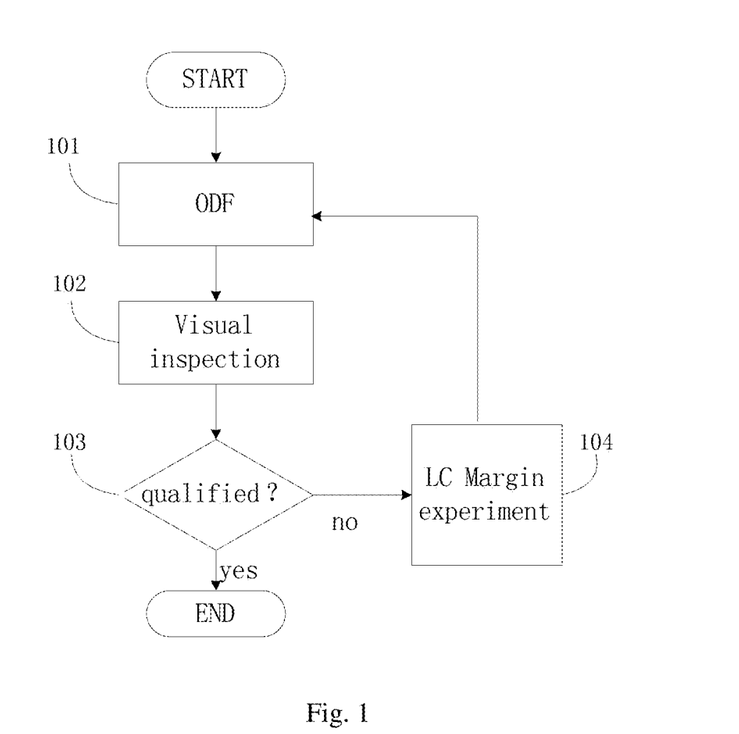
FIG. 1 is an exemplary flow diagram of a control method for a liquid crystal drop filling system in the prior art.

For example, FIG. 1 illustrates an exemplary flow chart of a control method for a liquid crystal drop filling/instillation system according to the prior art. As shown in the drawing, after a start, a liquid crystal panel is obtained by the liquid crystal drop filling process (step 101), and then the obtained liquid crystal panel is subject to a visual inspection (usually in a dark room) (step 102), determining by the inspection whether the sealant is broken, whether the liquid crystal is not filled, whether there is a defect which may be visually inspected, such as a bad/poor appearance (step 103). After it is determined that the liquid crystal panel is qualified, the inspection procedure is finished, and then the liquid crystal panel is sent to the following relevant procedures. If it is determined that the liquid crystal panel is defective, it will determined according to the severity of the defect how to dispose of the liquid crystal panel, for example, recycling or discarding, etc., and then, the inspection process is finished. After it is determined that the liquid crystal panel is defective due to the process (e.g., liquid crystal drop rate, liquid crystal drop accuracy, liquid crystal pattern, etc.), a complex LC Margin experiment as described above is performed to re-determine the relevant process parameters (step 104), then the parameters of ODF process are adjusted according to the parameters determined by the experiment so as to improve product quality.

The above-mentioned way of determining the amount of center liquid crystal has many drawbacks: 1) the reference value is calculated, and it may not be taken into account the box thickness difference due to the processing fluctuations (for example, the difference in uniformity of film thickness, difference in volume of Fan-out region, etc.); 2) in the production processes, there is no effective mechanism for monitoring the amount of liquid crystal drop, it may be determined whether the amount of liquid crystal is appropriate only after the LC margin test, which brings about problems such as an excessive long evaluation cycle and an excessive number of LC Split, and so on.

Further, the present liquid crystal drop filling process lacks an inspection mechanism for peripheral defects such as peripheral yellowing, light leakage, and may not performing a pre-checking before the product is finished, thus easily resulting in a waste of materials and money.

SUMMARY OF THE INVENTION

It is an object of the present invention to provide a novel liquid crystal drop filling system which comprises an inspection system for efficiently checking defects generated during a liquid crystal drop filling process, so that various defects may be detected at an early stage and an adjustment may be made to the liquid crystal drop filling process in time, thereby saving time and cost.

According to an aspect of the present invention, there is provided a liquid crystal drop filling system.

According to an exemplary embodiment, the liquid crystal drop filling system comprises a liquid crystal drop filling device configured to perform a liquid crystal drop filling process to obtain a liquid crystal panel; an image acquisition device configured to acquire an image of the liquid crystal panel; an image processor configured to process the acquired image and to determine a defect of the liquid crystal panel based on the processed image; and a communication module configured to communicate an information related to the defect determined by the image processor to the liquid crystal drop filling device, so that the liquid crystal drop filling device is enabled to adjust the parameters of the liquid crystal drop filling process according to the information.

According to an exemplary embodiment, the image processor is further configured to convert the acquired image of the liquid crystal panel to a gray-level image.

According to an exemplary embodiment, the image processor is further configured to identify a gray-level value of each pixel in the gray-level image and to identify a region in the gray-level image where the gray-level value falls within a predetermined range as a normal region, and identify a region in the gray-level image where the gray-level value goes beyond the predetermined range as a defective region.

According to an exemplary embodiment, the image processor is further configured to determine the type of the defect according to the gray-level value of the defective region.

According to an exemplary embodiment, the image processor is further configured to identify a region in the defective region where a gray-level value falls within a first gray-scale value range as an over-filled defective region; identify a region in a defective region where a gray-level value falls within a second gray-scale value range as a peripheral yellowing defective region; and/or identify a region in a defective region where a gray-level value falls within a third gray-scale value range as a light leaked defective region.

According to an exemplary embodiment, the image processor is further configured to perform one or more of the follows calculating the difference between the gray-level value of the defective region and the gray-level value of the normal region; calculating an area of each defective region;

calculating a ratio of the area of each defective region to the area of the liquid crystal panel; and determining the position of each defective region on the liquid crystal panel.

According to an exemplary embodiment, the image processor is further configured to determine a defect severity level of each defective region and/or the quality level of the liquid crystal panel depending on at least one of the follows the difference between the gray-level value of the defective region and the gray-level value of the normal region, the area of the defective region, the ratio of the area of the defective region to the area of the liquid crystal panel, the position of the defective region on the liquid crystal panel.

According to an exemplary embodiment, the communication module is further configured to inform the operator of the defect level and the quality level of the liquid crystal panel which are determined by the image processor, as well as a corresponding determination basis; and/or transmit the determination basis to the liquid crystal drop filling device.

According to another aspect of the present invention, there is provided a method for controlling a liquid crystal drop filling system, According to an exemplary embodiment, the control method comprises steps as follows acquiring an image of the liquid crystal panel; processing the acquired image; determining a defect of the liquid crystal panel based on the processed image; and adjusting parameters of the liquid crystal drop filling process according to a defect-related information.

According to an exemplary embodiment, the step of processing the acquired image comprises converting the acquired image to a gray-level image.

According to an exemplary embodiment, the step of determining a defect of the liquid crystal panel based on the processed image further comprises identifying a gray-level value of each pixel in the gray-level image and identifying a region in the gray-level image where the gray-level value falls within a predetermined range as a normal region, and identifying a region in the gray-level image where the gray-level value goes beyond the predetermined range as a defective region.

According to an exemplary embodiment, the step of determining a defect of the liquid crystal panel based on the processed image further comprises determining the type of the defect according to the gray-level value of the defective region.

According to an exemplary embodiment, the step of determining the type of the defect according to the gray-level value of the defective region further comprises identifying a region in the defective region where a gray-level value falls within a first gray-scale value range as an over-filled defective region; identifying a region in a defective region where a gray-level value falls within a second gray-scale value range as a peripheral yellowing defective region; and/or identifying a region in a defective region where a gray-level value falls within a third gray-scale value range as a light leaked defective region.

According to an exemplary embodiment, the control method further comprises one or more of the following steps calculating the difference between the gray-level value of the defective region and the gray-level value of the normal region; calculating an area of each defective region; calculating a ratio of the area of each defective region to the area of the liquid crystal panel; determining the position of each defective region on the liquid crystal panel.

According to an exemplary embodiment, the control method further comprises determine a defect severity level of each defective region and/or the quality level of the liquid crystal panel depending on at least one of the follows: the difference between the gray-level value of the defective region and the gray-level value of the normal region, the area of the defective region, the ratio of the area of the defective region to the area of the liquid crystal panel, the position of the defective region on the liquid crystal panel.

According to an exemplary embodiment, the control method further comprises informing the operator of the defect level and the quality level of the liquid crystal panel determined by the image processor, as well as a corresponding determination basis; and/or transmitting the determination basis to the liquid crystal drop filling device.

BRIEF DESCRIPTION OF THE DRAWINGS

Embodiments of the present disclosure will now be described, by way of example, with reference to the accompanying drawings in which.

DETAILED DESCRIPTION OF PREFERRED EMBODIMENTS OF THE INVENTION

In order that the objects, technical solutions and advantages of the present disclosure may be more readily understood, the principles of the present invention will be described in detail below with reference to the accompanying drawings and exemplary embodiments of the present invention. It is to be understood that the structures, methods, and processes of the present disclosure illustrated in the exemplary embodiments should not be considered as limiting the technical solutions of the present invention, and that the principles of the present disclosure may be practiced without a part of the steps or details, or additional steps or processes may be added during implementation of the embodiments. Accordingly, the scope of the present disclosure should be determined in accordance with the content of claims.

Figure 2:
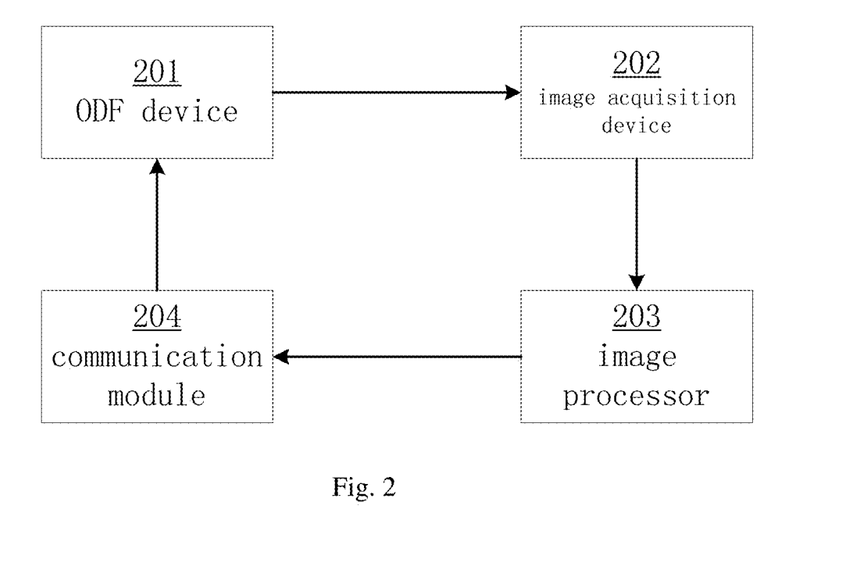
FIG. 2 is a schematic diagram of a liquid crystal drop filling system according to an embodiment of the present disclosure.

Next, a liquid crystal drop filling system according to an embodiment of the present disclosure will be described in detail with reference to FIG. 2. As shown in the FIG. 2, according to a first aspect of the present invention, the liquid crystal drop filling system comprises a liquid crystal drop filling device 201 configured to perform a liquid crystal drop filling process to obtain a liquid crystal panel; an image acquisition device 202 configured to acquire an image of the liquid crystal panel; an image processor 203 configured to process the acquired image and to determine a defect or defects of the liquid crystal panel based on the processed image; and a communication module 204 configured to communicate an information related to the defect determined by the image processor 203 to the liquid crystal drop filling device, so that the liquid crystal drop filling device is enabled to adjust the parameters of the liquid crystal drop filling process according to the information.

According to an exemplary embodiment, the image acquisition device 202 may be provided in a dark room for visual inspection of a liquid crystal panel, which dark room may be the same as a dark room in the prior art, including, for example, a backlight system, dimension of which matches at least that of the glass substrate of the liquid crystal panel, or may be set to be several times that of the liquid crystal panel to be inspected, so that a plurality of liquid crystal panels may be inspected simultaneously. In this way, the image of the liquid crystal panel may be acquired by the image acquiring means 202 while performing the visual inspection. At the same time, it is not necessary to transport the liquid crystal panel to another specialized inspection position, so that the efficiency of the inspection of the liquid crystal panel will not be adversely affected.

The image acquisition device 202 may be a CCD-based image acquisition device, such as a camera. The image processor 203 may be any one type of image processors capable of image processing including, but not limited to, a computer processor, a microprocessor, or the like.

According to an exemplary embodiment, the image processor 203 is further configured to convert the acquired image of the liquid crystal panel to a gray-level image and is further configured to identify a gray-level value of each pixel in the gray-level image and to identify a region in the gray-level image where the gray-level value falls within a predetermined range as a normal region, and identify a region in the gray-level image where the gray-level value goes beyond the predetermined range as a defective region.

Specifically, after the image obtained by the image acquisition device 202 is transferred to the image processor 203, the image processor 203 may convert a color image into a gray-level image (or a gray-scale image) by the gray-scale processing. There are various methods of image gray-scale processing in the prior art, and they will not be specifically described herein for the sake of brevity.

After conversion of a color image into a gray-level image, the image processor first determines the gray-level values of the individual pixels in the gray-level image, and then judges whether the gray-level value of the pixel falls within a predetermined range of the gray-level value. The predetermined range of the gray-level values varies depending on the liquid crystal material used, the substrate materials of the TFT substrate and the color film substrate, and the like. A predetermined range for a particular liquid crystal material or for certain conditions may usually be obtained experimentally. If the gray level falls within the predetermined range, the image processor determines that the liquid crystal distribution in the liquid crystal panel in the region corresponding to the pixel is normal; or otherwise, the liquid crystal in the region corresponding to the pixel is determined to be defective.

In an exemplary embodiment, the image processor 203 is further configured to determine the type of the defect according to the gray-level value of the defective region.

Specifically, according to an exemplary embodiment, the image processor 203 is further configured to identify a region in the defective region where a gray-level value falls within a first gray-scale value range as an over-filled defective region; identify a region in a defective region where a gray-level value falls within a second gray-scale value range as a peripheral yellowing defective region; and/or identify a region in a defective region where a gray-level value falls within a third gray-scale value range as a light-leaked defective region.

Specifically, the first gray-scale value range is a gray-level value in the gray-level image corresponding to an overfill defect, and the second gray-scale value range is a gray-level value in the gray-level image corresponding to a peripheral yellowing defect; and the third gray-scale value range is a gray-level value range in the gray-level image corresponding to the light leakage defect. Similar to the predetermined range of the liquid crystal described above, the above-described first to third gray-scale value ranges may be obtained in advance experimentally.

Figure 4:
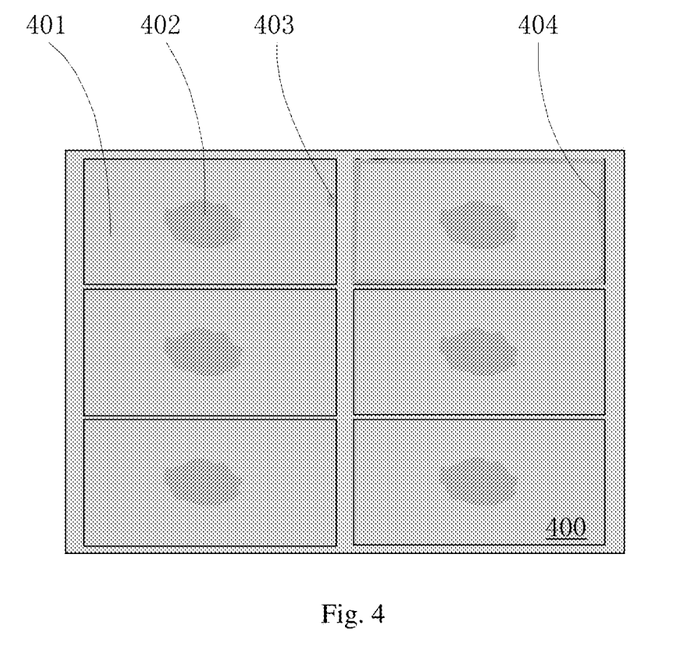
FIG. 4 is a schematic diagram of an image of a liquid crystal panel obtained by an image acquisition device of a liquid crystal drop filling system according to an embodiment of the present disclosure.
Figure 5:
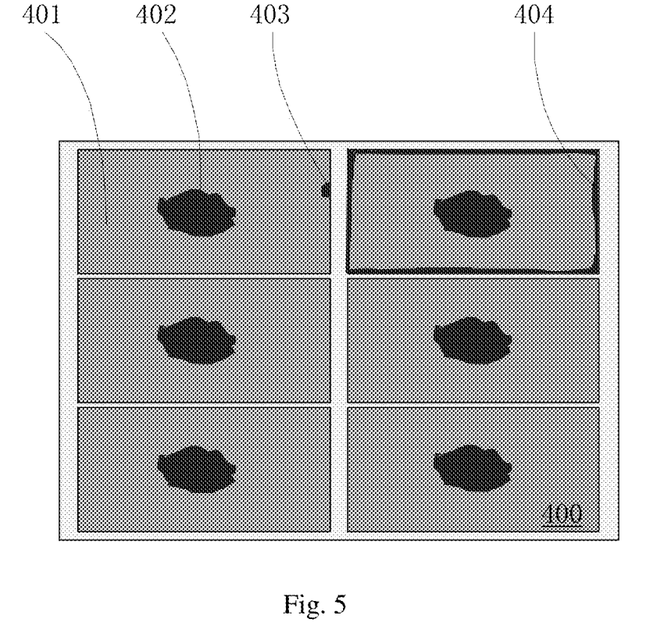
FIG. 5 is a schematic diagram of a gray-level image obtained after performing a gray-scale processing on the image of the liquid crystal panel in FIG. 4.

FIGS. 4 and 5 schematically illustrate an image of a liquid crystal panel obtained by an image acquisition device of a liquid crystal drop filling system and a gray-level image obtained after the image is gray-scale processed, respectively.

An array configured by an arrangement of six liquid crystal panels 400 is shown in FIGS. 4 and 5, respectively. Of course, in the actual detection process, the detection may be performed to a single LCD panel, or the detection may be performed simultaneously to various arrangements of a plurality of liquid crystal panels. The image shown in FIG. 4 illustrates the normal region 401 and the defective region present in the liquid crystal panel. These defective regions include, but are not limited to, overfill region 402, light leakage region 403, and peripheral yellowing region 404. In the acquired color image, they have respective colors. For example, the normal region 401 is represented by a light blue region in FIG. 4, the overfill region 402 is presented by a light yellow region in FIG. 4, the light leakage region 403 is represented by a bright yellow region in FIG. 4, and the peripheral yellowing region 404 is represented by a khaki surrounding region. After that, the image shown in FIG. 4 forms the gray-level image shown in FIG. 5 after being gray-scale processed. In FIG. 5, the colors of the normal regions and various defective regions have been converted to corresponding gray levels, such that the image processor 203 may determine the gray level values of the respective regions to perform the analysis and determination of the specific defect types described above.

After determining whether the liquid crystal panel is defective by the gray-scale image, it may be further determined whether these defects are sufficient to cause the liquid crystal panel to be unqualified. Some defects may have legal standards, while others have no legal standards, but there are some industry standards. However, there are some flaws that have neither legal nor industry standards, but have only enterprise standards. Further, different enterprises often have their different standards. Therefore, the standard for the LCD panel being qualified may be determined according to the actual situation.

In an exemplary embodiment, the image processor 203 is further configured to perform one or more of the follows: calculating the difference between the gray-level value of the defective region and the gray-level value of the normal region; calculating an area of each defective region; calculating a ratio of the area of each defective region to the area of the liquid crystal panel; and determining the position of each defective region on the liquid crystal panel.

The gray level value of the defective region and the gray level value of the normal region described above may be, for example, one of the average value, the median value, the upper limit value, and the lower limit value of the pixel gray level value in the respective regions or selects an appropriate value as needed.

For example, where the type of each defect has been determined (e.g., overfilled, peripheral yellowing, and light leakage, etc.), the image processor 203 is further configured to calculate the area of the overfilled defective region, the ratio of the area of the overfilled defective region to the area of the liquid crystal panel, the area of the peripheral yellowing defective region, the ratio of the area of the peripheral yellowing defective region to the area of the liquid crystal panel, the area of the light leakage defective region, the ratio of the area of the light leakage defective region to the area of the liquid crystal panel.

In an exemplary embodiment, the image processor 203 is further configured to determine a defect severity level of each defective region and/or the quality level of the liquid crystal panel depending on at least one of the follows: the difference between the gray-level value of the defective region and the gray-level value of the normal region, the area of the defective region, the ratio of the area of the defective region to the area of the liquid crystal panel, and the position of the defective region on the liquid crystal panel.

Specifically, for example, where the type of each defect has been determined (e.g., overfilled, peripheral yellowing, and light leakage, etc.), the image processor 203 is further configured to determine a defect severity level and/or the quality level of the liquid crystal panel depending on at least one of the follows: the difference between the gray-level value of the defective region and the gray-level value of the normal region, the area of the overfilled defective region, the ratio of the area of the overfilled defective region to the area of the liquid crystal panel, the area of the peripheral yellowing defective region, the ratio of the area of the peripheral yellowing defective region to the area of the liquid crystal panel, the area of the light leakage defective region, the ratio of the area of the light leakage defective region to the area of the liquid crystal panel, and the position of the defective region on the liquid crystal panel.

Specifically, in some embodiments, a threshold may be provided for any of the above evaluation basis. For example, a first threshold value may be provided for a difference between a gray-level value of a defective region and a gray-level value of a normal region, for example, the threshold is 20. If it is calculated that the gray level value of the defective region is 100 while the calculated gray level value of the normal region is 110, the difference therebetween is 10, which doesn't reach the first threshold value 20, then it is considered that the color difference between the defective region and the normal region is not large, and accordingly, the quality of the liquid crystal panel is not greatly affected. As another example, a second threshold value of 3% may be provided for the ratio of the area of the peripheral yellowing defective region to the area of the liquid crystal panel. If the calculated ratio of the area of the peripheral yellowing defective region to the area of the liquid crystal panel is larger than 3%, it is considered that the peripheral yellowing defect may seriously affect the display effect of the liquid crystal panel. Depending on the different criteria (legal standards, industry standards, enterprise standards, or customer requirements), different thresholds may be provided for the above evaluation basis.

In some embodiments, it is also possible that multiple thresholds are provided for an evaluation basis so as to rank the severity of the defect. For example, each defect (overfill, peripheral yellowing, or light leakage) may be classified into: none, negligible, minor, moderate, severe, very severe and so on. Thereby the severity of the defect may be graded according to the calculation results.

In certain embodiments, the quality level of the liquid crystal display may also be synthetically evaluated in accordance with the level of the various defects. The corresponding standards may be specifically set based on the actual situation (legal standards, industry standards, enterprise standards, or customer requirements, etc.). For example, among the above three kinds of defects, the quality of the liquid crystal panel may be directly judged to be unacceptable/unqualified as long as one defect is evaluated as severe or very severe. Also, for example, although none of the defects reach a severe or very severe level, the three types of defects are all of a medium level, and the LCD panel may also be judged to be unacceptable/unqualified depending on the standards set by the enterprise itself.

As an example, the quality level of the liquid crystal panel may be classified into four levels: excellent, good, qualified and unqualified, according to comprehensive evaluation to the level of the defects, and the subsequent processing mode of the liquid crystal panel is determined according to the quality level of the liquid crystal panel.

In an exemplary embodiment, the communication module 204 is further configured to inform the operator of the defect level and the quality level of the liquid crystal panel which are determined by the image processor, as well as a corresponding determination basis; and/or transmit the determination basis to the liquid crystal drop filling device 201.

The manner to inform the operator may include, for example, issuing a visual alert, an audible alarm, and sending an information to a control device in front of the operator for display on the display of the control device or the like.

The above-described determination basis may include, for example, as above-mentioned, the difference between the gray-level value of the defective region and the gray-level value of the normal region, the area of the overfilled defective region, the ratio of the area of the overfilled defective region to the area of the liquid crystal panel, the area of the peripheral yellowing defective region, the ratio of the area of the peripheral yellowing defective region to the area of the liquid crystal panel, the area of the light leakage defective region, the ratio of the area of the light leakage defective region to the area of the liquid crystal panel, and the position of the defective region on the liquid crystal panel.

Specifically and illustratively, if the ratio of the overfilled defective region to the total area of the liquid crystal panel exceeds 5%. The communication module may transmit the information to the liquid crystal drop filling device so that, for example, the liquid crystal drop filling device may turn down the liquid crystal drop amount by 5% accordingly. As another example, if the image processor determines that a light leakage defect is present in the upper left corner of the liquid crystal panel, the liquid crystal drop filling device may change the pattern of the drop filling, either automatically or by an operator, upon receipt of the information provided via the communication module, An additional liquid crystal drop is provided at the position where the light leakage defect is present, so that the defect may be eliminated.

According to embodiments of the present invention, there is provided a liquid crystal drop filling system capable of performing effective inspection of defects (e.g., overfilling, peripheral yellowing, light leakage, etc.) generated during a liquid crystal drop filling process, thereby enabling early detection of various defects, promptly adjusting the liquid crystal drop filling process, and saving time and cost.

According to the second aspect of the present invention, there is provided a method for controlling a liquid crystal drop filling system, According to an exemplary embodiment, the control method comprises steps as follows acquiring an image of the liquid crystal panel; processing the acquired image; determining a defect of the liquid crystal panel based on the processed image; and adjusting parameters of the liquid crystal drop filling process according to a defect-related information.

Figure 3:
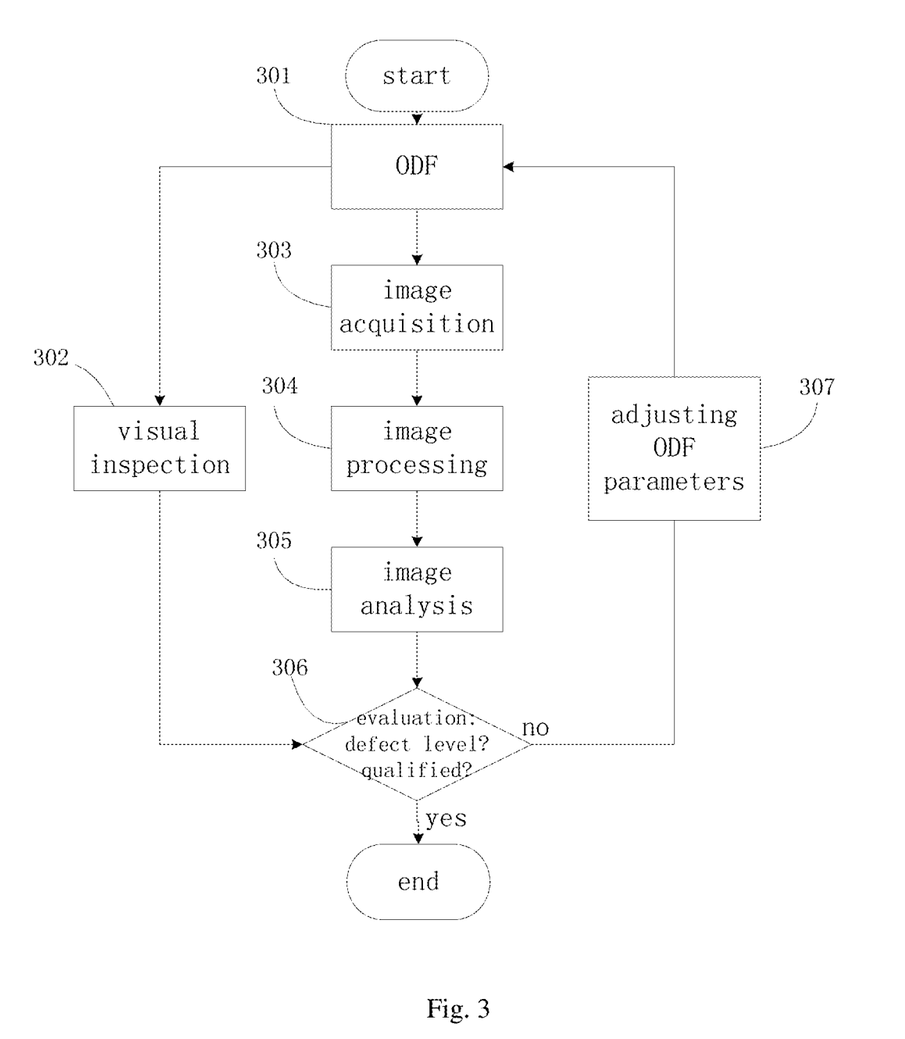
FIG. 3 is an exemplary flow diagram of a control method for a liquid crystal drop filling system according to an embodiment of the present disclosure.

FIG. 3 is an exemplary flow diagram of a control method for a liquid crystal drop filling system according to an embodiment of the present disclosure.

Specifically, after the operation of the liquid crystal drop filling system is started, a liquid crystal panel is obtained by dropping the liquid crystal in a liquid crystal drop filling (ODF) process in a block 301, and then, in a block 302, the liquid crystal is subject to a visual inspection in a dark room with a conventional technique in the prior art. At the same time with or after the visual inspection, an image analysis check to the liquid crystal panel may be started. According to an embodiment of the present invention, an image analysis check to a liquid crystal panel includes acquiring an image of a liquid crystal panel (block 303), processing the acquired image (block 304), determining a defect of the liquid crystal panel based on the processed image (block 305). Then, in block 306, the defect that has been determined is evaluated. Specifically, the severity of each defect may be determined, the specific method of which may be seen in the description of the liquid crystal drop filling system according to the embodiment of the present disclosure as described above, and will not be described repeatedly herein. At the same time, or alternatively, in block 306, the quality of the liquid crystal panel is further judged whether the quality of the liquid crystal panel is satisfactory with the comprehensive evaluation to the levels of the various defects. If it is determined that the quality of the liquid crystal panel is unacceptable, the relevant information is provided to the operator and/or fed back to the liquid crystal drop filling device to adjust the parameters of the liquid crystal drop filling process. If it is determined that the quality of the liquid crystal panel is at or above the acceptable level, it is not necessary to feedback the result information, and the inspection process to the liquid crystal panel ends.

Specifically, according to an exemplary embodiment, the step of processing the acquired image comprises converting the acquired image to a gray-level image. Further, according to an exemplary embodiment, the step of determining a defect of the liquid crystal panel based on the processed image further comprises identifying a gray-level value of each pixel in the gray-level image and identifying a region in the gray-level image where the gray-level value falls within a predetermined range as a normal region, and identifying a region in the gray-level image where the gray-level value goes beyond the predetermined range as a defective region.

Further, according to an exemplary embodiment, the step of determining a defect of the liquid crystal panel based on the processed image further comprises determining the type of the defect according to the gray-level value of the defective region.

Further, according to an exemplary embodiment, the step of determining the type of the defect according to the gray-level value of the defective region further comprises identifying a region in the defective region where a gray-level value falls within a first gray-scale value range as an over-filled defective region; identifying a region in a defective region where a gray-level value falls within a second gray-scale value range as a peripheral yellowing defective region; and/or identifying a region in a defective region where a gray-level value falls within a third gray-scale value range as a light leaked defective region.

According to an exemplary embodiment, the control method further comprises one or more of the following steps calculating the difference between the gray-level value of the defective region and the gray-level value of the normal region; calculating an area of each defective region; calculating a ratio of the area of each defective region to the area of the liquid crystal panel; and determining the position of each defective region on the liquid crystal panel.

Specifically and illustratively, where the type of each defect has been determined (e.g., overfilled, peripheral yellowing, and light leakage, etc.), above steps are specifically one or more of the following: calculating the difference between the gray-level value of the defective region and the gray-level value of the normal region, calculating the area of the overfilled defective region, calculating the ratio of the area of the overfilled defective region to the area of the liquid crystal panel, calculating the area of the peripheral yellowing defective region, calculating the ratio of the area of the peripheral yellowing defective region to the area of the liquid crystal panel, calculating the area of the light leakage defective region, calculating the ratio of the area of the light leakage defective region to the area of the liquid crystal panel.

The details of the image conversion, the determination of the normal region and the defective region, the determination of the specific defect type, and the like described above may be referred to the above description in connection with the liquid crystal drop filling system, and the description thereof will not be repeated here.

Next, according to an exemplary embodiment, the control method may further include determining a defect severity level of each defective region and/or the quality level of the liquid crystal panel depending on at least one of the follows: the difference between the gray-level value of the defective region and the gray-level value of the normal region, the area of the defective region, the ratio of the area of the defective region to the area of the liquid crystal panel, and the position of the defective region on the liquid crystal panel. In the case that the type of each defect is determined, specific examples may be also referred to above.

Finally, the control method further comprises informing the operator of the determined defect level and the quality level of the liquid crystal panel, as well as a corresponding determination basis; and/or transmitting the determination basis to the liquid crystal drop filling device. Thus, the liquid crystal drop device may automatically adjust the parameters of the ODF process according to the information provided by the communication module. When necessary, the operator may also be actively involved in the adjustment of liquid crystal drop filling device.

According to embodiments of the present invention, there is provided a method for controlling a liquid crystal drop filling system, which is capable of performing effective inspection of defects (e.g., overfilling, peripheral yellowing, light leakage, etc.) generated during a liquid crystal drop filling process, thereby enabling early detection of various defects, promptly adjusting the liquid crystal drop filling process, and saving time and cost.

Thus, preferred embodiments of the present disclosure have been described in detail by way of example. However, those skilled in the art will recognize that further modifications and variations may be made thereto without departing from the spirit of the present disclosure, and all such modifications and variations are intended to be within the scope of the present invention. Accordingly, the scope of protection of the present invention should be determined by the scope of the claims.

What is claimed is:

1. A liquid crystal drop filling system, comprising:
a liquid crystal drop filling device configured to perform a liquid crystal drop filling process to obtain a liquid crystal panel;
an image acquisition device configured to acquire an image of the liquid crystal panel;
an image processor configured to process the acquired image and to determine a defect of the liquid crystal panel based on the processed image; and
a communication circuit configured to communicate information related to the defect determined by the image processor to the liquid crystal drop filling device, so that the liquid crystal drop filling device adjusts parameters of the liquid crystal drop filling process according to the information;
wherein the image processor is further configured to convert the acquired image of the liquid crystal panel to a gray-level image;
wherein the image processor is further configured to identify a gray-level value of each pixel in the gray-level image and to identify a region in the gray-level image where the gray-level value falls within a predetermined range as a normal region, and identify a region in the gray-level image where the gray-level value goes beyond the predetermined range as a defective region;
wherein the image processor is further configured to determine the type of the defect according to the gray-level value of the defective region;
wherein the image processor is further configured to
identify a region in the defective region where a gray-level value falls within a first gray-scale value range as an over-filled defective region;
identify a region in a defective region where a gray-level value falls within a second gray-scale value range as a peripheral yellowing defective region; and/or
identify a region in a defective region where a gray-level value falls within a third gray-scale value range as a light leaked defective region.

2. The liquid crystal drop filling system according to claim 1, wherein the image processor is further configured to perform one or more of the following:
calculating the difference between the gray-level value of the defective region and the gray-level value of the normal region;
calculating an area of each defective region;
calculating a ratio of the area of each defective region to the area of the liquid crystal panel; and
determining the position of each defective region on the liquid crystal panel.

3. The liquid crystal drop filling system according to claim 2, wherein the image processor is further configured to:
determine a defect severity level of each defective region and/or the quality level of the liquid crystal panel depending on at least one of the following:
the difference between the gray-level value of the defective region and the gray-level value of the normal region,
the area of the defective region,
the ratio of the area of the defective region to the area of the liquid crystal panel, and
the position of the defective region on the liquid crystal panel.

4. The liquid crystal drop filling system according to claim 3, wherein the communication circuit is further configured to:
inform an operator of a defect level and a quality level of the liquid crystal panel determined by the image processor, as well as a corresponding determination basis; and/or
transmit the determination basis to the liquid crystal drop filling device.

5. A method for controlling a liquid crystal drop filling system, comprising:
acquiring an image of a liquid crystal panel;
processing the acquired image;
determining a defect of the liquid crystal panel based on the processed image; and
adjusting parameters of the liquid crystal drop filling process according to a defect-related information,
wherein the step of processing the acquired image comprises converting the acquired image to a gray-level image;
wherein the step of determining a defect of the liquid crystal panel based on the processed image further comprises identifying a gray-level value of each pixel in the gray-level image and identifying a region in the gray-level image where the gray-level value falls within a predetermined range as a normal region, and identifying a region in the gray-level image where the gray-level value goes beyond the predetermined range as a defective region;
wherein the step of determining a defect of the liquid crystal panel based on the processed image further comprises determining the type of the defect according to the gray-level value of the defective region;
wherein the step of determining the type of the defect according to the gray-level value of the defective region further comprises identifying a region in the defective region where a gray-level value falls within a first gray-scale value range as an over-filled defective region;
identifying a region in a defective region where a gray-level value falls within a second gray-scale value range as a peripheral yellowing defective region; and/or
identifying a region in a defective region where a gray-level value falls within a third gray-scale value range as a light leaked defective region.

6. The control method according to claim 5, wherein the control method further comprises one or more of the following steps:
calculating the difference between the gray-level value of the defective region and the gray-level value of the normal region;
calculating an area of each defective region;
calculating a ratio of the area of each defective region to the area of the liquid crystal panel; and
determining the position of each defective region on the liquid crystal panel.

7. The control method according to claim 6, further comprising:
determining a defect severity level of each defective region and/or the quality level of the liquid crystal panel depending on at least one of the following:
the difference between the gray-level value of the defective region and the gray-level value of the normal region,
the area of the defective region,
the ratio of the area of the defective region to the area of the liquid crystal panel, and the position of the defective region on the liquid crystal panel.

8. The control method according to claim 7, further comprising:
- informing an operator of a defect level and a quality level of the liquid crystal panel determined by the image processor, as well as a corresponding determination basis; and/or
- transmitting the determination basis to the liquid crystal drop filling device.

* * * * *